United States Patent [19]

Kashiwagi et al.

[11] Patent Number: 5,409,090
[45] Date of Patent: Apr. 25, 1995

[54] DAMPING FORCE CONTROL TYPE HYDRAULIC SHOCK ABSORBER

[75] Inventors: Akira Kashiwagi, Kanagawa; Takashi Nezu; Takao Kohara, both of Tokyo, all of Japan

[73] Assignee: Tokico Ltd., Kanagawa, Japan

[21] Appl. No.: 67,616

[22] Filed: May 27, 1993

[30] Foreign Application Priority Data

May 30, 1992 [JP] Japan .................................. 4-164244

[51] Int. Cl.⁶ .............................................. F16F 9/346
[52] U.S. Cl. .................................. 188/319; 188/322.15
[58] Field of Search ............... 188/281, 282, 286, 287, 188/299, 319, 322.15

[56] References Cited

U.S. PATENT DOCUMENTS

| | | | |
|---|---|---|---|
| 3,827,538 | 8/1974 | Morgan | 188/319 |
| 4,645,043 | 2/1987 | Imaizumi | 188/319 |
| 4,765,446 | 8/1988 | Murata et al. | 188/319 |
| 4,800,994 | 1/1989 | Imaizumi et al. | 188/299 X |
| 4,800,995 | 1/1989 | Bernhardt et al. | 188/299 X |
| 4,997,068 | 3/1991 | Ashiba | 188/282 X |
| 5,129,488 | 7/1992 | Furuya et al. | 188/282 |
| 5,242,038 | 9/1993 | Yamaoka | 188/299 X |
| 5,293,971 | 3/1994 | Kanari et al. | 188/299 X |

FOREIGN PATENT DOCUMENTS

| | | | |
|---|---|---|---|
| 4138117 | 5/1992 | Germany | 188/322.15 |
| 4219141 | 12/1992 | Germany | 188/282 |
| 58-70533 | 5/1983 | Japan . | |
| 61-75008 | 4/1986 | Japan . | |

Primary Examiner—Robert J. Oberleitner
Assistant Examiner—Alfred Muratori
Attorney, Agent, or Firm—Wenderoth, Lind & Ponack

[57] ABSTRACT

A damping force control type hydraulic shock absorber includes a cylinder having a hydraulic fluid sealed therein. A piston is slidably fitted in the cylinder to divide the inside of the cylinder into two chambers. A main hydraulic fluid passage provides communication between the two chambers and has a damping force generating mechanism. A bypass passage also provides communication between the two chambers. A cylindrical guide member is provided in the bypass passage to provide communication between two portions of the bypass passage which lead to the two chambers, respectively, through ports provided in the side wall of the guide member. A cylindrical shutter is rotatably fitted in the guide member. The shutter has openings capable of aligning with the ports. The ports and the openings cooperate to provide a damping force which changes generally linearly as the shutter rotates.

20 Claims, 8 Drawing Sheets

DAMPING FORCE CONTROL TYPE HYDRAULIC SHOCK ABSORBER

BACKGROUND OF THE INVENTION

1. Field of the Invention

The present invention relates to a damping force control type hydraulic shock absorber for use in a suspension system of a vehicle, for example, an automobile.

2. Description of the Prior Art

Hydraulic shock absorbers for use in a suspension system of an automobile or other vehicle include damping force control type hydraulic shock absorbers which are designed so that the level of damping force can be controlled properly in accordance with the road surface conditions, vehicle running conditions, etc., thereby improving the ride quality and steering stability of the vehicle.

Japanese Utility Model Application Public Disclosure (KOKAI) No. 58-70533 (1983) discloses one example of the conventional hydraulic shock absorbers of the type described above. The disclosed hydraulic shock absorber includes a cylinder having a hydraulic fluid sealed therein, and a piston having a piston rod connected thereto. The piston is slidably fitted in the cylinder to divide the inside of the cylinder into two chambers. The two chambers are communicated with each other through first and second hydraulic fluid passages. The first hydraulic fluid passage is provided with a first damping force generating mechanism (comprising an orifice, a disk valve, etc.) for generating a relatively large damping force. The second hydraulic fluid passage is provided with a second damping force generating mechanism for generating a relatively small damping force and is also provided with a damping force control valve for opening and closing the second hydraulic fluid passage.

With the above arrangement, when the damping force control valve is open, the hydraulic fluid in the cylinder mainly flows through the second hydraulic fluid passage in response to the sliding motion of the piston caused by the extension and retraction of the piston rod, generating a relatively small damping force during both the extension and retraction strokes, thus providing "soft" damping force characteristics. When the damping force control valve is closed, the hydraulic fluid in the cylinder flows only through the first hydraulic fluid passage in response to the sliding motion of the piston caused by the extension and retraction of the piston rod, generating the relatively large damping force during both the extension and retraction strokes, thus providing "hard" damping force characteristics. In this way, the damping force characteristics can be changed over from one to the other by opening or closing the damping force control valve.

Japanese Patent Application Public Disclosure (KOKAI) No. 61-75008 (1986) discloses a hydraulic shock absorber in which the second hydraulic fluid passage for providing communication between the two chambers in the cylinder comprises two hydraulic fluid passages respectively having check valves, one of which allows flow of the hydraulic fluid in only one direction, while the other allows flow of the hydraulic fluid in only another direction reversed to the above. The prior art further includes a shutter having a pair of openings for controlling the passage area of each of the two hydraulic fluid passages, thereby enabling different damping force characteristics to be obtained for the extension and retraction strokes by controlling the passage areas of the two hydraulic fluid passages through the shutter.

However, these conventional damping force control type hydraulic shock absorbers suffer from the following problems.

In the hydraulic shock absorber disclosed in Japanese Utility Model Application Public Disclosure (KOKAI) No. 58-70533 (1983), the relationship between the damping force characteristics for the extension and retraction strokes remains unchanged even when the damping force characteristics are changed from "soft" to "hard" or vice versa. In the hydraulic shock absorber disclosed in Japanese Patent Application Public Disclosure (KOKAI) No. 61-75008 (1986), the passage areas of the two hydraulic fluid passages are controlled by using a pair of openings provided in the shutter. Therefore, the range of selectable combinations of damping force characteristics for the extension and retraction strokes is small.

However, it is necessary in order to improve the ride quality and steering stability of a vehicle to change over damping force characteristics in accordance with various road conditions, vehicle running conditions, etc. Therefore, it is impossible to meet the requirements satisfactorily with the damping force controllable range of the above-described conventional damping force control type hydraulic shock absorbers.

SUMMARY OF THE INVENTION

In view of the above-described circumstances, it is an object of the present invention to provide a damping force control type hydraulic shock absorber which enables a desired combination of different damping force characteristics for the extension and retraction strokes to be selected from among a plurality of combinations in accordance with the position of rotation of the shutter.

To this end, the present invention provides a damping force control type hydraulic shock absorber including a cylinder having a hydraulic fluid sealed therein, and a piston slidably fitted in the cylinder to divide the inside of the cylinder into two chambers. A piston rod is connected at one end thereof to the piston. The other end of the piston rod extends as far as the outside of the cylinder. A main hydraulic fluid passage provides communication between the two chambers and has a damping force generating mechanism. A bypass passage also provides communication between the two chambers. A cylindrical guide member is provided in the bypass passage to provide communication between two portions of the bypass passage which lead to the two chambers, respectively, through a plurality of ports provided in the side wall of the guide member. A cylindrical shutter is rotatably fitted in the guide member. The shutter has opening means capable of aligning with the ports. The ports are arranged to be capable of selectively aligning with the opening means at different positions, respectively, of rotation of the shutter. At least one of the ports is axially offset with respect to the other ports.

In addition, the present invention provides a damping force control type hydraulic shock absorber including a cylinder having a hydraulic fluid sealed therein, and a piston slidably fitted in the cylinder to divide the inside of the cylinder into two chambers. A piston rod is connected at one end thereof to the piston. The other end of the piston rod extends as far as the outside of the cylinder. A main hydraulic fluid passage provides communication between the two chambers and has a damping force generating mechanism. A bypass passage also provides communication between the two chambers. A cylindrical guide member is provided in the bypass passage to provide communication between two portions of the bypass passage which lead to the two chambers, respectively, through port means provided in the side wall of the guide member. A cylindrical shutter is rotatably fitted in the guide member. The shutter has a plurality of openings capable of aligning with the port means. The openings are arranged to be capable of selectively aligning with the port means at different positions, respectively, of rotation of the shutter. At least one of the openings is axially offset with respect to the other openings.

According to the present invention, a desired combination of damping force characteristics for the extension and retraction strokes can be selected from among a plurality of combinations by rotating the shutter so as to change the combination of ports and openings to be aligned with each other.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS:

Embodiments of the present invention will be described below in detail with reference to the accompanying drawings.

Figure 1:
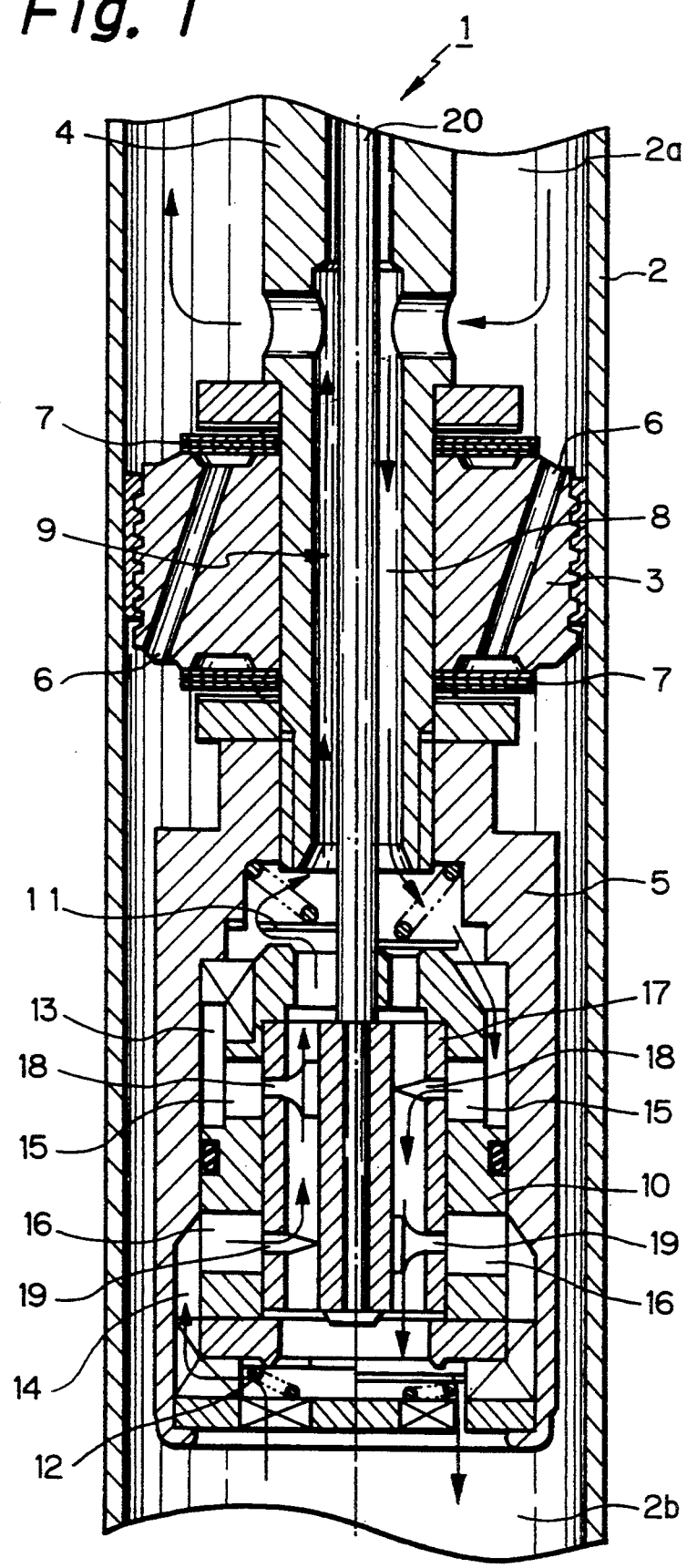
FIG. 1 is a longitudinal sectional view of one embodiment of the present invention.

A first embodiment of the present invention will be explained below with reference to FIGS. 1 to 5. As shown in FIG. 1, a damping force control type hydraulic shock absorber 1 includes a cylinder 2 having a hydraulic fluid sealed therein, and a piston 3 which is slidably fitted in the cylinder 2 to divide the inside of the cylinder 2 into two chambers, i.e., a cylinder upper chamber 2a and a cylinder lower chamber 2b. The piston 3 is pierced with one end portion of a piston rod 4. The piston rod 4 has a cylindrical passage member 5 screwed onto the distal (inner) end portion thereof. Thus, the passage member is secured to the piston 3. The other end portion of the piston rod 4 extends as far as the outside of the cylinder 2 through a rod guide (not shown) and a seal member (not shown), which are provided in the end portion of the cylinder 2. In addition, the cylinder 2 is provided with a reservoir chamber (not shown) for compensating for changes in the amount of hydraulic fluid in the cylinder 2 that corresponds to the amount by which the piston rod 4 enters or withdraws from the cylinder 2 during each stroke of the reciprocating motion.

The piston 8 is provided with main hydraulic fluid passages 6 for providing communication between the cylinder upper and lower chambers 2a and 2b. Each end face of the piston 3 is provided with a damping force generating mechanism 7 comprising disk valves and an orifice (not shown). The damping force generating mechanism 7 generates relatively large damping force by controlling the flow of the hydraulic fluid in the associated main hydraulic fluid passage 6.

The piston rod 4 is provided with a hydraulic fluid passage 8 that extends axially through the piston rod 4 to communicate at one end thereof with the cylinder upper chamber 2a and at the other end thereof with the inside of the passage member 5 at the cylinder lower chamber side. The hydraulic fluid passage 8 and the passage member 5 constitute a bypass passage 9 that provides communication between the cylinder upper and lower chambers 2a and 2b.

The passage member 5 is fitted with a cylindrical guide member 10. The end face of the guide member 10 that is closer to the cylinder upper chamber 2a is provided with a first check valve 11 which allows the hydraulic fluid to flow toward the cylinder upper chamber 2a from the inside of the guide member 10 but prevents the flow of the hydraulic fluid in the reverse direction. The end of the guide member 10 that is closer to the cylinder lower chamber 2b is provided with a second check valve 12 which allows the hydraulic fluid to flow toward the cylinder lower chamber 2b from the inside of the guide member 10 but prevents the flow of the hydraulic fluid in the reverse direction.

Between the passage member 5 and the guide member 10 are formed a first hydraulic fluid passage 13 communicated with the cylinder upper chamber 2a to bypass the first check valve 11, and a second hydraulic fluid passage 14 communicated with the cylinder lower chamber 2b to bypass the second check valve 12. The side wall of the guide member 10 is provided with a pair of first ports 15 communicated with the first hydraulic fluid passage 13 and a pair of second ports 16 communicated with the second hydraulic fluid passage 14.

The guide member 10 has a cylindrical shutter 17 rotatably fitted therein. The side wall of the shutter 17 is provided with first non-circular openings 18 including ones provided in a region which faces the pair of first ports 15. The side wall of the shutter 17 is further provided with second non-circular openings 19 including ones provided in a region which faces the pair of second ports 16.

Figure 2:
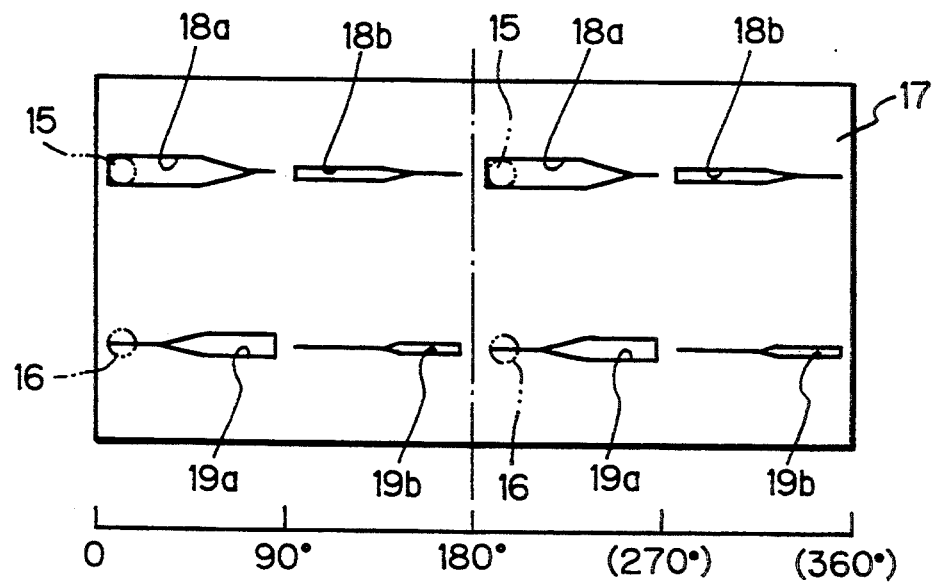
FIG. 2 is a development view of a shutter employed in the first embodiment of the present invention.

FIG. 2 is a development view of the side wall of the shutter 17. As shown in FIG. 2, the first openings 18 include a pair of openings 18a provided at respective positions which are 180° circumferentially offset with respect to each other so as to face the pair of ports 15, respectively, and another pair of openings 18b provided at respective positions which are 90° offset with respect to the openings 18a. Each of the openings 18a and 18b has a portion shaped in a generally triangular configuration so that the width of the opening gradually increases as the distance from one end thereof increases toward the other end in the circumferential direction of the side wall of the shutter 17. The second openings 19 include a pair of openings 19a provided at respective positions which are 180° circumferentially offset with respect to each other so as to face the pair of ports 16, respectively, and another pair of openings 19b provided at respective positions which are 90° offset with respect to the openings 19a. Each of the openings 19a and 19b has a portion shaped in a generally triangular configuration so that the width of the opening gradually decreases as the distance from one end thereof increases toward the other end in the same circumferential direction as the above in reverse relation to the openings 18a and 18b. The openings 18a have a larger opening area than that of the openings 18b and, similarly, the openings 19a have a larger opening area than that of the openings 19b.

Assuming that the angle of rotation of the shutter 17, when set in a position where the area of communication between the ports 15 and the openings 18a reaches a maximum, while the area of communication between the ports 16 and the openings 19a reaches a minimum (i.e., the position shown by the two-dot chain lines in FIG. 2), is 0°, when the angle of rotation of the shutter 17 is in the range of 0° to 90°, the ports 15 and the openings 18a align with each other, and so do the ports 16 and the openings 19a. Consequently, the first and second hydraulic fluid passages 13 and 14 are communicated with each other with an area corresponding to the angle of rotation of the shutter 17. When the angle of rotation of the shutter 17 is in the range of 90° to 180°, the ports 15 and the openings 18b align with each other, and so do the ports 16 and the openings 19b. Consequently, the first and second hydraulic fluid passages 13 and 14 are communicated with each other with an area corresponding to the angle of rotation of the shutter 17.

The shutter 17 has a control rod 20 connected thereto. The control rod 20 extends along the piston rod 4 as far as the outside of the damping force control type hydraulic shock absorber 1. The shutter 17 can be rotated through the control rod 20 by an actuator or the like (not shown) from the outside of the damping force control type hydraulic shock absorber 1.

It should be noted that the right-hand half of FIG. 1 shows the condition of the damping force control type hydraulic shock absorber 1 during the extension stroke, while the left-hand half shows the condition during the retraction stroke, and the arrows indicate the directions of the flow of the hydraulic fluid.

The operation of the first embodiment, arranged as described above, will be explained below.

When the piston speed is so low that the pressure in the main hydraulic fluid passages 6 does not reach a predetermined level at which the valves of the damping force generating mechanisms 7 are opened, the hydraulic fluid in the cylinder 2 flows through the bypass passage 9 in response to the extension and retraction of the piston rod 4, thereby generating damping force. At this time, during the extension stroke, the hydraulic fluid in the bypass passage 9 flows from the cylinder upper chamber side toward the cylinder lower chamber side. Consequently, the first check valve 11 is closed, while the second check valve 12 is opened, and the hydraulic fluid flows through the first hydraulic fluid passage 13, thus generating damping force in accordance with the area of communication between the ports 15 and the openings 18. During the retraction stroke, the hydraulic fluid in the bypass passage 9 flows from the cylinder lower chamber side toward the cylinder upper chamber side. Consequently, the first check valve 11 is opened, while the second check valve 12 is closed, and the hydraulic fluid flows through the second hydraulic fluid passage 14, thus generating damping force in accordance with the area of communication between the ports 16 and the openings 19. As the speed of the reciprocating motion of the piston 3, which is caused by the extension and retraction of the piston rod 4, increases, the pressure in the main hydraulic fluid passages 6 rises. When the pressure reaches the predetermined level, the valves of the damping force generating mechanisms 7 are opened. Thus, a relatively large damping force is generated.

The damping force characteristics are controlled by externally changing tile angle of rotation of the shutter 17 through the control rod 20 by an actuator or the like (not shown) so as to change the area of communication, which is determined by the degree of alignment of the ports 15 and 16 of the guide member 10 with the openings 18 and 19 of the shutter 17.

When the angle of rotation of the shutter 17 is in the region around 0°, the area of communication between the ports 15 and the openings 18a (i.e., the effective cross sectional area of the first hydraulic fluid passage 13) is relatively large, while the area of communication between the ports 16 and the openings 19a (i.e., the effective cross sectional area of the second hydraulic fluid passage 14) is relatively small. Accordingly, during the extension stroke, "soft" damping force characteristics are obtained to provide a relatively small damping force. During the retraction stroke, "hard" damping force characteristics are obtained to provide a relatively large damping force.

As the angle of rotation of the shutter 17 increases from 0° to 90°, the area of communication between the ports 15 and the openings 18a (i.e., the effective cross sectional area of the first hydraulic fluid passage 13) decreases, whereas the area of communication between the ports 16 and the openings 19a (i.e., the effective cross sectional area of the second hydraulic fluid passage 14) increases. Accordingly, the damping force characteristics for the extension stroke gradually approach "hard" characteristics, while the damping force characteristics for the retraction stroke gradually approach "soft" characteristics, as shown by the solid lines in FIG. 3.

Figure 3:
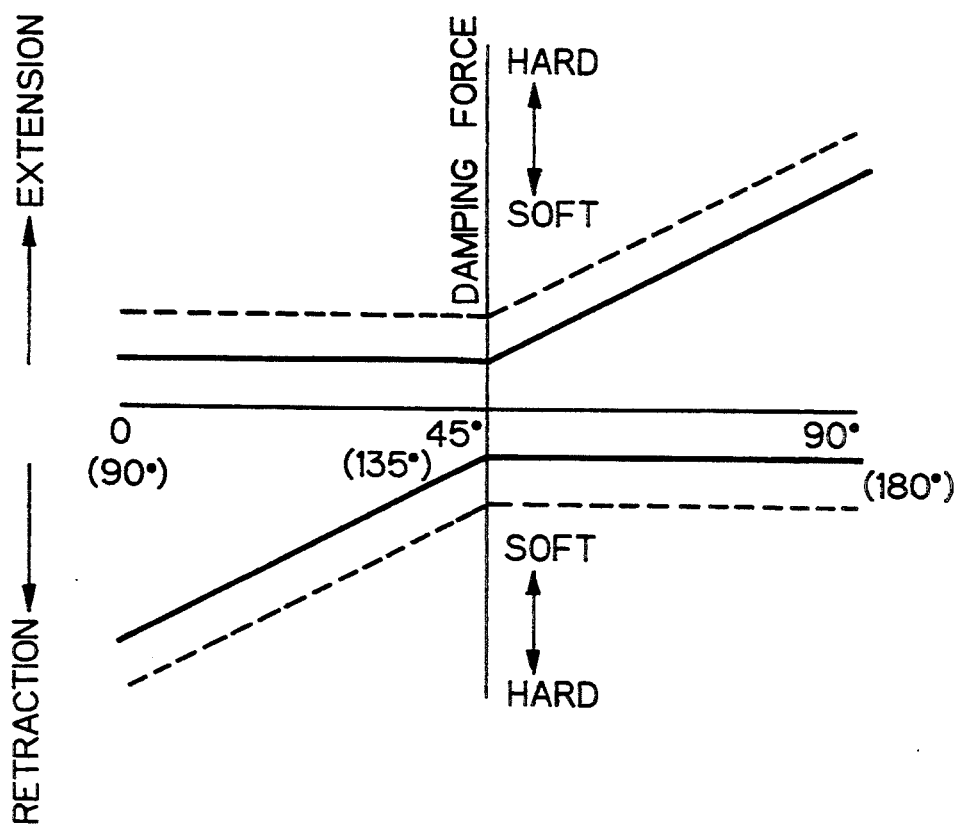
FIG. 3 is a graph showing damping force characteristics of the first embodiment of the present invention.

As is appreciated from the foregoing and with reference to FIG. 3, the generally angular portions of the openings 18 and 19 are so shaped that the damping forces provided thereby linearly change as the shutter rotates.

When the angle of rotation of the shutter 17 is in the range of 90° to 180°, the ports 15 align with the openings 18b to communicate the first hydraulic fluid passage 13, and the ports 16 align with the openings 19b to communicate the second hydraulic fluid passage 14. In this case also, the damping force characteristics change in accordance with the angle of rotation of the shutter 17 in the same way as in the case of the rotation angle range of 0° to 90°. Since the opening areas of the openings 18b and 19b are smaller than those of the openings 18a and 19a, the damping force characteristics obtained in this rotation angle range are closer to the "hard" characteristics than in the case of the rotation angle range of 0° to 90° for both extension and retraction strokes, as shown by the chain lines in FIG. 3.

Thus, a desired combination of damping force characteristics for the extension and retraction strokes can be selected from two different combinations, that is, one obtained when the angle of rotation of the shutter 17 is set in the range of 0° to 90°, and the other obtained when the angle is set in the range of 90° to 180°.

Further, since the ports 15 and 16 are disposed in symmetry with respect to the center of the guide member 10 and the openings 18 and 19 are also disposed in symmetry with respect to the center of the shutter 17, the pressure of the hydraulic fluid acting on the shutter 17 is balanced. Therefore, the shutter 17 can be rotated smoothly.

Figure 4:
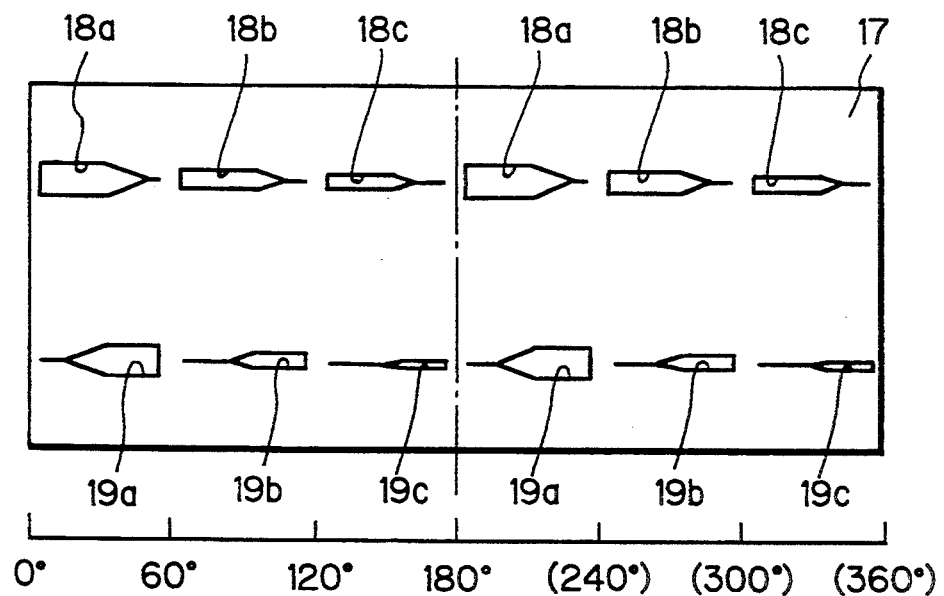
FIG. 4 is a development view showing another example of the shutter shown in FIG. 2 in the first embodiment of the present invention.
Figure 5:
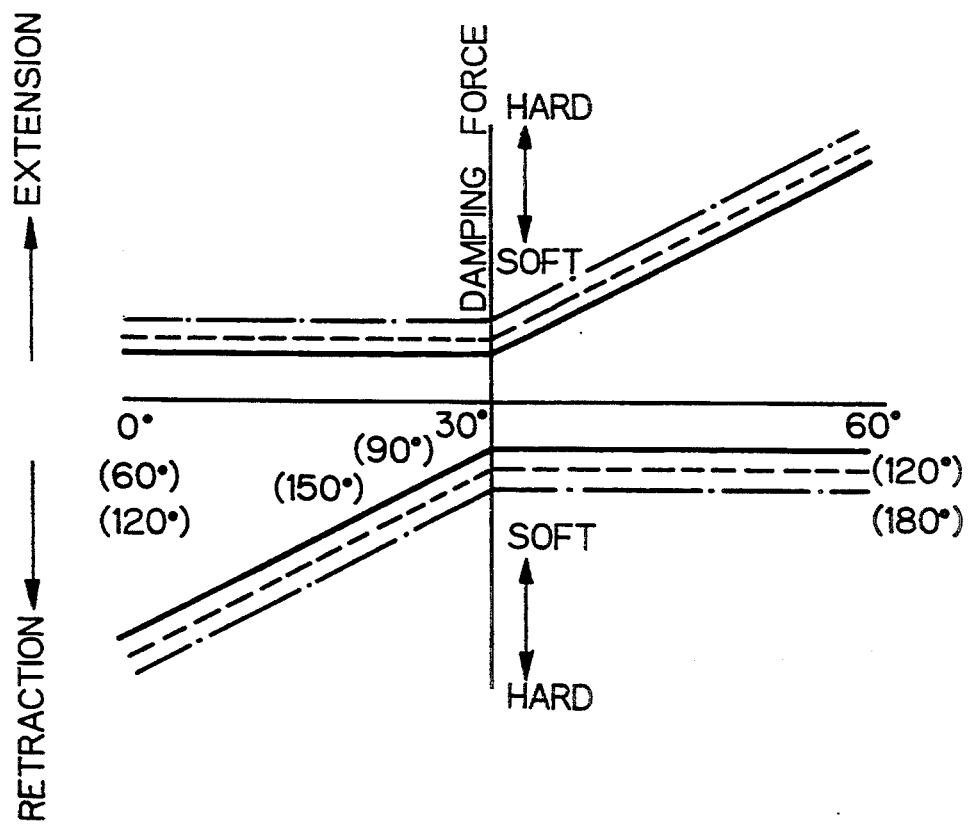
FIG. 5 is a graph showing damping force characteristics of the first embodiment that employs the shutter shown in FIG. 4.

If the openings 18 and 19 of the shutter 17 are comprised of three pairs of openings 18a, 18b and 18c and 19a, 19b and 19c, respectively, which are 60° offset with respect to each other in the circumferential direction of the shutter 17, as shown in FIG. 4, it is possible to select a desired combination of damping force characteristics from among three different combinations, which respectively correspond to three shutter rotation angle ranges: 0° to 60°; 60° to 120°; and 120° to 180°. FIG. 5 shows damping force characteristics obtained with the shutter 17 shown in FIG. 4. In FIG. 5, the solid lines show damping force characteristics obtained in the rotation angle range of 0° to 60°, the chain lines show damping force characteristics obtained in the rotation angle range of 60° to 120°, and the one-dot chain lines show damping force characteristics obtained in the rotation angle range of 120° to 180°. If the number of openings is further increased, it is possible to increase the number of ranges of selectable combinations of damping force characteristics.

Next, a second embodiment of the present invention will be described with reference to FIGS. 1 and 6 to 10. Since the second embodiment differs from the first embodiment, shown in FIG. 1, only in the arrangements of the ports and openings, which are respectively provided in the guide member and the shutter, the same members as those in the first embodiment are denoted by the same reference numerals, and only the portions in which the second embodiment differs from the first embodiment will be explained below in detail.

Figure 6:
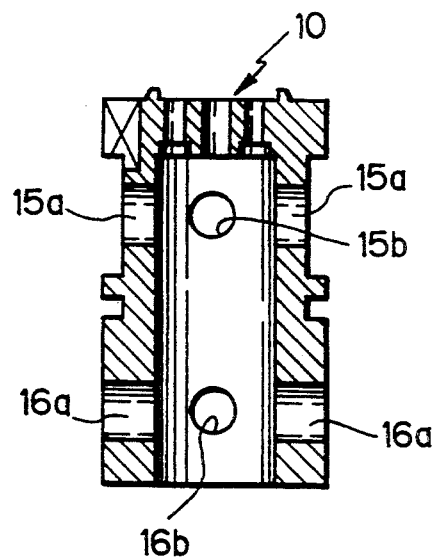
FIG. 6 is a longitudinal sectional view of a guide member employed in a second embodiment of the present invention.
Figure 7:
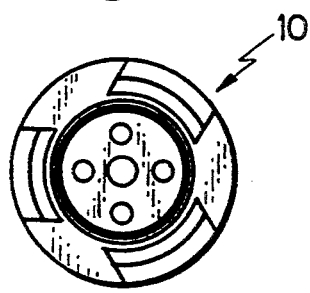
FIG. 7 is a plan view of the guide member shown in FIG. 6.

As shown in FIG. 6, the side wall of the guide member 10 is provided with the first ports 15, which are communicated with the first hydraulic fluid passage 13. The first ports 15 include a pair of ports 15a and another pair of ports 15b which are 90° offset with respect to the ports 15a in the circumferential direction of the guide member 10. The side wall of the guide member 10 is further provided with the second ports 16, which are communicated with the second hydraulic fluid passage 14. The second ports 16 include a pair of ports 16a and another pair of ports 16b which are 90° offset with respect to the ports 16a in the circumferential direction of the guide member 10. The ports 15b are smaller than the ports 15a, and the ports 16b are also smaller than the ports 16a. FIG. 7 is a plan view of the guide member 10.

Figure 9:
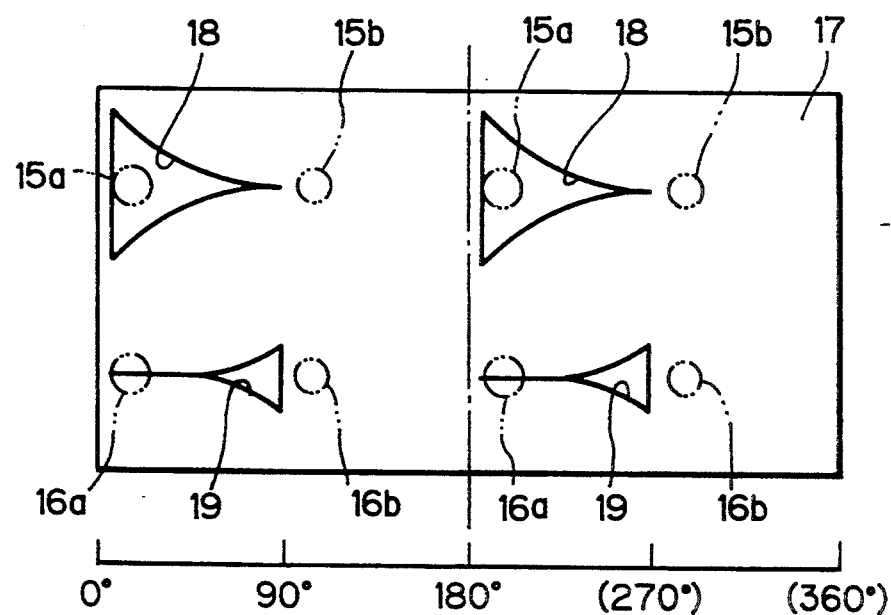
FIG. 9 is a development view of a shutter employed in the second embodiment of the present invention.

FIG. 9 is a development view of the side wall of the shutter 17. As shown in FIG. 9, the side wall of the shutter 17 is provided with a pair of first openings 18 which can be placed in opposing relation to the ports 15a and 15b, and it is further provided with a pair of second openings 19 which can be placed in opposing relation to the ports 16a and 16b. The openings 18 each have a substantially triangular configuration such that the width of the opening gradually increases as the distance from one end thereof increases toward the other end in the circumferential direction of the side wall of the shutter 17. The openings 18 are provided at respective positions which are 180° circumferentially offset with respect to each other. The openings 19 each have such a substantially triangular configuration that the width of the opening gradually decreases as the distance from one end thereof increases toward the other end in the same circumferential direction as the above in reverse relation to the openings 18. The openings 19 are provided at respective positions which are 180° circumferentially offset with respect to each other.

Assuming that the angle of rotation of the shutter 17, when set in a position where the area of communication between the ports 15a and the openings 18 reaches a maximum, while the area of communication between the ports 16a and the openings 19 reaches a minimum (i.e., the position shown by the two-dot chain lines in FIG. 9), is 0°, when the angle of rotation of the shutter 17 is in the range of 0° to 90°, the ports 15a and the openings 18 align with each other, and so do the ports 16a and the openings 19. Consequently, the first and second hydraulic fluid passages 13 and 14 are each communicated with an area corresponding to the angle of rotation of the shutter 17. At this time, the ports 15b and 16b are closed by the side wall of the shutter 17. When the angle of rotation of the shutter 17 is in the range of 90° to 180°, the ports 15b and the openings 18 align with each other, and so do the ports 16b and the openings 19. Consequently, the first and second hydraulic fluid passages 13 and 14 are each communicated with an area corresponding to the angle of rotation of the shutter 17. At this time, the ports 15a and 16a are closed by the side wall of the shutter 17.

The operation of the second embodiment, arranged as described above, will be explained below.

When the rotational angle of the shutter 17 is in the range of 0° to 90°, the ports 15a, which have a relatively large diameter, and the openings 18 align with each other, and so do the ports 16a, which have a relatively large diameter, and the openings 19. Accordingly, the first and second hydraulic fluid passages 13 and 14 are each communicated with a relatively large area corresponding to the angle of rotation of the shutter 17. Thus, damping force characteristics close to the "soft" characteristics are obtained, as shown by the solid lines in FIG. 10, in the same way as in the first embodiment. When the angle of rotation of the shutter 17 is in the range of 90° to 180°, the ports 15b, which have a relatively small diameter, and the openings 18 align with each other, and so do the ports 16b, which have a relatively small diameter, and the openings 19. Accordingly, the first and second hydraulic fluid passages 13 and 14 are each communicated with a relatively small area corresponding to the angle of rotation of the shutter 17. Thus, damping force characteristics close to the "hard" characteristics are obtained, as shown by the chain lines in FIG. 10, in the same way as in the first embodiment.

Figure 10:
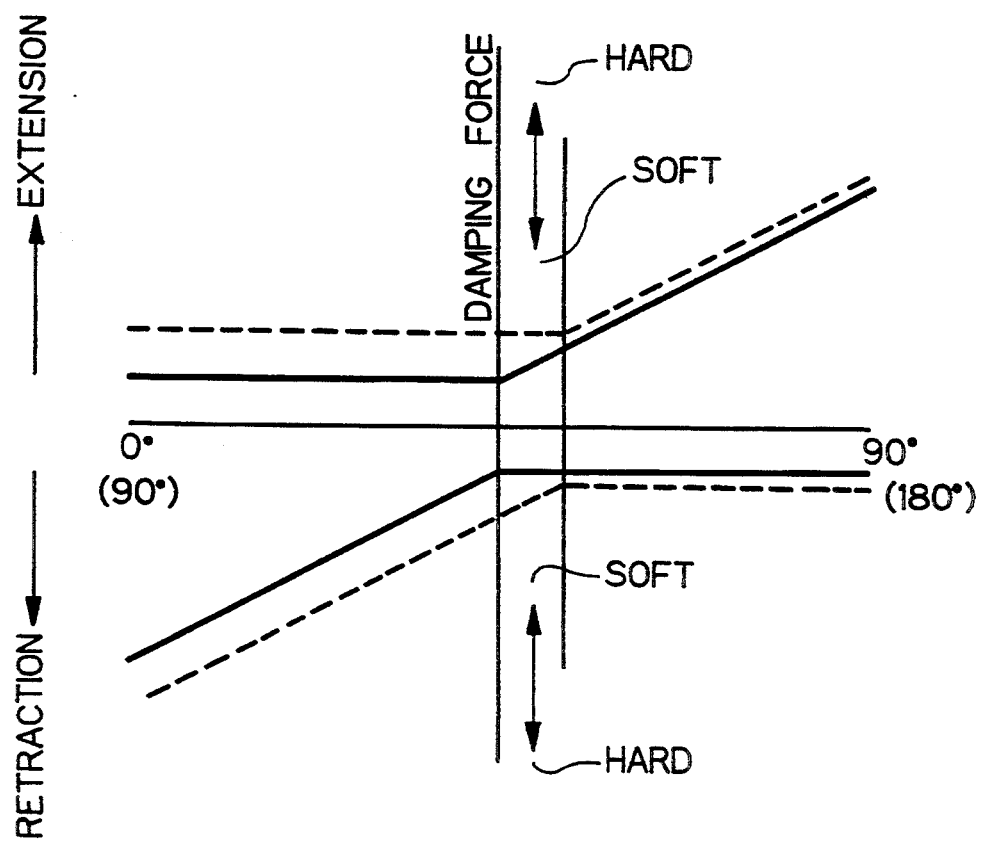
FIG. 10 is a graph showing damping force characteristics of the second embodiment of the present invention.

As is appreciated from the foregoing and with reference to FIG. 10, each of the openings 18 and 19 has such a generally triangular configuration that in the range where the diameter of the associated port is larger than the width of the opening, the damping force provided by the opening changes linearly as the shutter rotates.

In this way, a desired combination of damping force characteristics for the extension and contraction strokes can be selected from two different combinations, that is, one obtained when the angle of rotation of the shutter 17 is set in the range of 0° to 90° to align the large-diameter ports 15a and 16a with the openings 18 and 19, and the other obtained when the angle is set in the range of 90° to 180° to align the small-diameter ports 15b and 16b with the openings 18 and 19.

Figure 8:
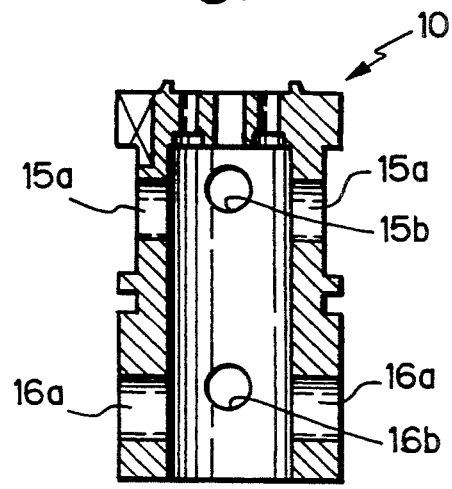
FIG. 8 is a longitudinal sectional view of another example of the guide member shown in FIG. 6 in the second embodiment of the present invention.

Although in the described embodiment the ports 15a and 15b and the ports 16a and 16b are varied in size to change the areas of communication obtained by alignment with the openings 18 and 19, the same effect can also be obtained by axially offsetting the ports 15a and 15b with respect to each other and similarly offsetting the ports 16a and 16b with respect to each other, as shown in FIG. 8. If the number of openings is further increased, it is possible to increase the number of ranges of selectable combinations of damping force characteristics.

Next, a third embodiment of the present invention will be described with reference to FIGS. 1 and 11 to 14. Since the third embodiment differs from the first embodiment only in the arrangements of the ports and openings, which are respectively provided in the guide member and the shutter, the same members as those in the first embodiment are denoted by the same reference numerals, and only the portions in which the third embodiment differs from the first embodiment will be explained below in detail.

Figure 11:
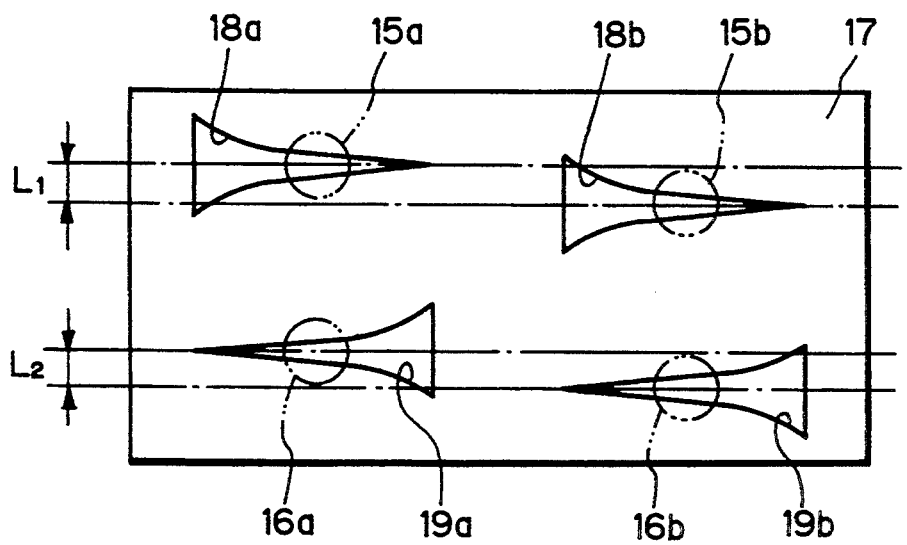
FIG. 11 is a development view showing the arrangement of ports provided in a guide member and openings provided in a shutter in the third embodiment of the present invention.

As shown in FIG. 11, the side wall of the guide member 10 is provided with a pair of first ports 15a and 15b, which are communicated with the first hydraulic fluid passage 13, and another pair of second ports 16a and 16b, which are communicated with the second hydraulic fluid passage 14. The ports 15a and 15b are offset with respect to each other by $L_1$ in the axial direction of the guide member 10. The ports 16a and 16b are also offset with respect to each other by $L_2$ in the axial direction of the guide member 10.

The side wall of the shutter 17 is provided with a pair of first openings 18a and 18b which can be placed in opposing relation to the first ports 15a and 15b, and it is further provided with a pair of second openings 19a and 19b which can be placed in opposing relation to the second ports 16a and 16b. The openings 18a and 18b each have a substantially triangular configuration that the width of the opening gradually increases as the distance from one end thereof increases toward the other end in the circumferential direction of the side wall of the shutter 17. The openings 18a and 18b are provided at respective positions which are 180° circumferentially offset with respect to each other. The openings 19a and 19b each have a substantially triangular configuration such that the width of the opening gradually decreases as the distance from one end thereof increases toward the other end in the same circumferential direction as the above in reverse relation to the openings 18a and 18b. The openings 19a and 19b are provided at respective positions which are 180° circumferentially offset with respect to each other. Further, the openings 18a and 18b are offset with respect to each other by $L_1$ in the axial direction of the shutter 17 in conformity to the ports 15a and 15b so that the openings 18a and 18b align with the ports 15a and 15b, respectively, with their centers matched with each other. Similarly, the openings 19a and 19b are offset with respect to each other by $L_2$ in the axial direction of the shutter 17 in conformity to the ports 16a and 16b so that the openings 19a and 19b align with the ports 16a and 16b, respectively, with their centers matched with each other.

Figure 12:
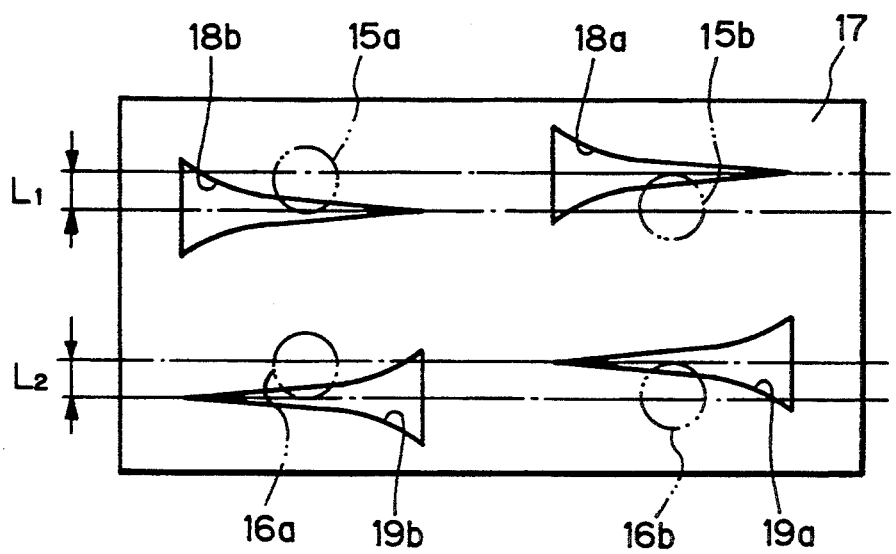
FIG. 12 is a development view of the shutter shown in FIG. 11 which is in a position reached when the shutter that is in the position shown in FIG. 11 is rotated through 180°.
Figure 13:
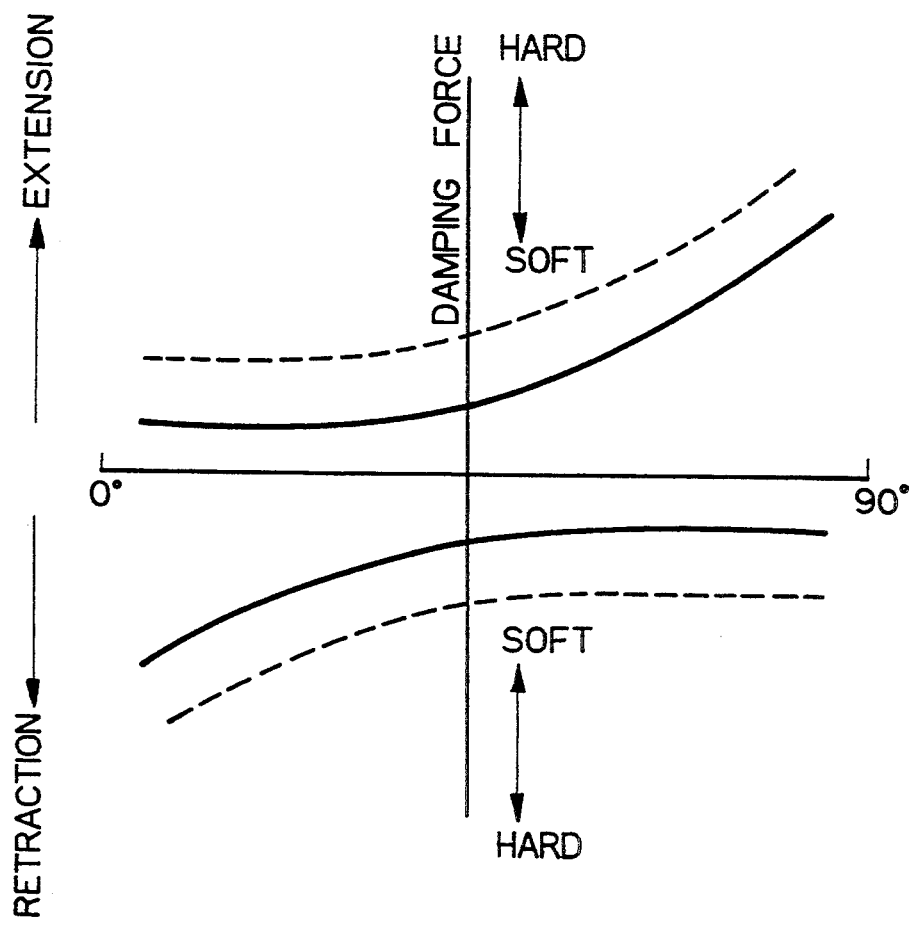
FIG. 13 is a graph showing damping force characteristics of the third embodiment of the present invention.

When the shutter 11 is rotated through 180° from the position shown in FIG. 11, the ports 15a and 15b align with the openings 18b and 18a, respectively, with their centers offset with respect to each other, as shown in FIG. 12. In addition, the ports 16a and 16b align with the openings 19b and 19a, respectively, with their centers offset with respect to each other, as shown in FIG. 12. Thus, the area of communication between each port and the associated opening is smaller than in the case of alignment in which their centers are matched with each other as described above.

The operation of the third embodiment, arranged as described above, will be explained below.

When the ports 15a and 15b align with the openings 18a and 18b, respectively, while the ports 16a and 16b align with the openings 19a and 19b, respectively, as shown in FIG. 11, the first and second hydraulic fluid passages 13 and 14 are each communicated with an area corresponding to the angle of rotation of the shutter 17. At this time, since the center of each port and that of the associated opening are coincident with each other, a relatively large area of communication is obtained. Accordingly, damping force characteristics close to the "soft" characteristics are obtained, as shown by the solid lines in FIG. 13.

When the shutter 17 is rotated through 180° so that the ports 15a and 15b align with the openings 18b and 18a, respectively, while the ports 16a and 16b align with the openings 19b and 19a, respectively, as shown in FIG. 12, the first and second hydraulic fluid passages 13 and 14 are each communicated with an area corresponding to the angle of rotation of the shutter 17. At this time, since the center of each port and that of the associated opening are offset with respect to each other, the area of communication is relatively small. Accordingly, damping force characteristics close to the "hard" characteristics are obtained, as shown by the chain lines in FIG. 13.

Thus, a desired combination of damping force characteristics for the extension and strokes can be selected from two different combinations by changing the angle of rotation of the shutter 17 so as to change the combination of ports and openings to be aligned with each other.

Since in this embodiment two different damping force characteristics can be obtained through the combination of the same ports 15 and 16 and the same openings 18 and 19 by rotating the shutter 17 through 180°, the number of openings required is smaller than in the first and second embodiments. Thus, machining is facilitated. Further, since each combination of damping force characteristics can be controlled over a range of 180°, fine adjustment can be made.

Figure 14:
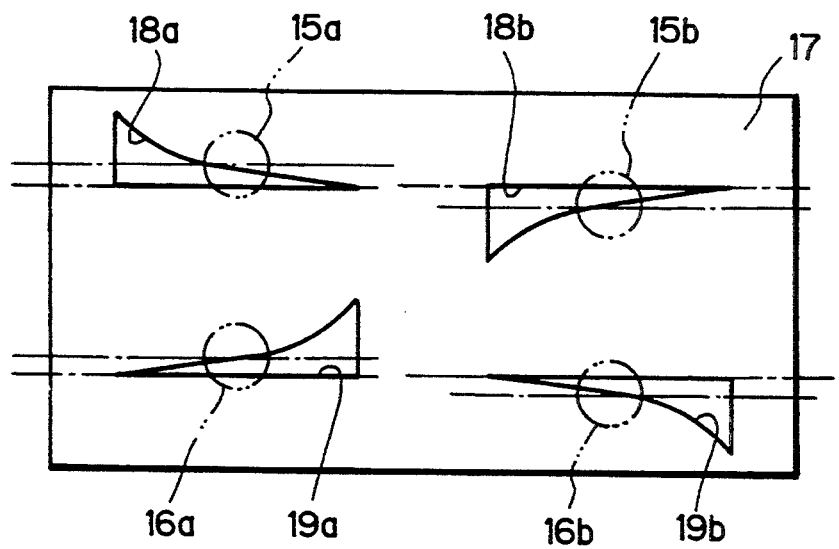
FIG. 14 is a development view showing another example of the configuration of the openings of the shutter in the third embodiment of the present invention.

If the openings 18a, 18b, 19a and 19b of the shutter 17 in this embodiment are so shaped that one side of each of the openings 18a and 18b extends on one common circumferential line, while one side of each of the openings 19a and 19b extends on another common circumferential line, as shown in FIG. 14, and the shutter 17 is comprised of three members divided by these two circumferential lines, then the abutting surfaces of these members are flat, so that it is possible to facilitate machining required to form the openings 18a, 18b, 19a and 19b.

Although in the foregoing embodiments a plurality of openings are provided in the shutter and a plurality of ports are provided in the guide member, it should be noted that the number of openings or ports may be one.

Figure 15:
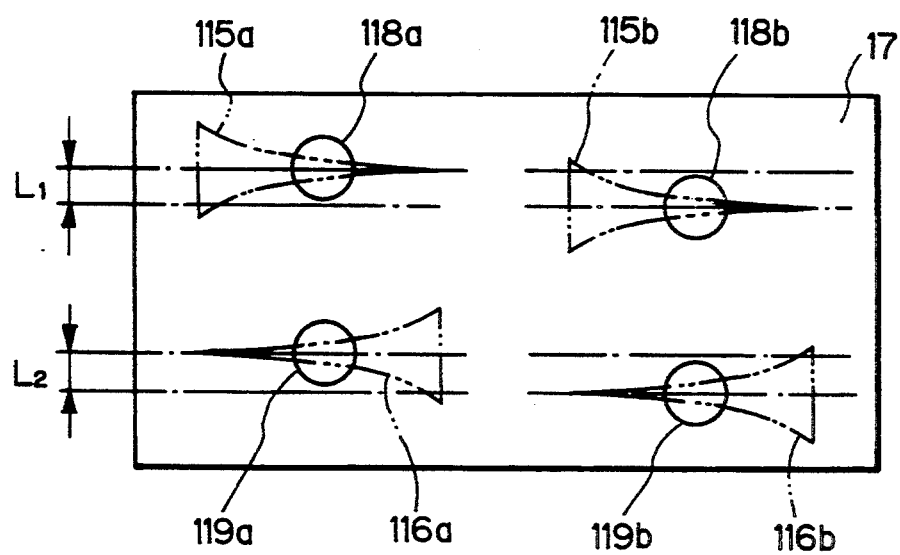
FIG. 15 is a development view showing a modification of the ports and the openings of the embodiment shown in FIG. 11.

Furthermore, in the foregoing embodiments, the ports provided in the guide members are circular and the openings in the shutters are non-circular having generally triangular portions. However, the same effect may be brought about by the arrangement shown in FIG. 15. The arrangement in FIG. 15 is substantially the same as that in FIG. 11. However, in FIG. 15, ports 115a, 115b, 116a and 116b formed in the guide member are non-circular having generally triangular portions and openings 118a, 119b, 119a and 119b formed in the shutter 17 are circular.

What is claimed is:

1. A hydraulic shock absorber, comprising:
a cylinder having a hydraulic fluid sealed therein;
a piston slidably fitted in said cylinder dividing the inside of said cylinder into two chambers;
a piston rod having one end thereof connected to said piston and the other end thereof extending outside of said cylinder;
a main hydraulic fluid passage extending between said two chambers, said main hydraulic fluid passage comprising a damping force generating mechanism;
a bypass passage extending between said two chambers;
a cylindrical guide member located in said bypass passage and communicating two portions of said bypass passage that communicate with said two chambers, respectively, through a plurality of ports in a side wall of said guide member, said plurality of ports comprising first and second ports that are axially offset with respect to each other in the axial direction of said cylindrical guide member and circumferentially spaced from each other; and
a cylindrical shutter rotatably fitted in said guide member and having an opening capable of aligning with said first and second ports;
wherein said opening is configured such that when said shutter is rotated in one direction, a damping force created by the flow of hydraulic fluid through said opening and one of said first and second ports changes with the amount of rotation of said shutter, said shutter having a first shutter rotation range in which said opening is aligned with said first port so that the damping force continuously changes from a relatively large damping force to a relatively small damping force in a first damping force range and a second shutter rotation range in which said opening is aligned with said second port so that the damping force continuously changes from a relatively large damping force to a relatively small damping force in a second damping force range that is different from said first damping force range.

2. The hydraulic shock absorber of claim 1, wherein said first and second ports are circumferentially spaced from each other by 180 degrees, and said opening is a first opening, and further comprising a second opening in said shutter capable of aligning with said first and second ports, wherein said first and second openings are axially offset from each other and circumferentially spaced from each other by 180 degrees.

3. The hydraulic shock absorber of claim 2, wherein said ports are circular.

4. The hydraulic shock absorber of claim 1, wherein said guide member comprises an interior, a first end and a second end, wherein a first check valve is provided at said first end for preventing flow of the hydraulic fluid from said first end of said guide member into said interior during an extension stroke of said piston and a second check valve is provided at said second end for preventing flow of the hydraulic fluid from said second end of said guide member to said interior during a retraction stroke of said piston, and wherein said plurality of ports comprises an extension port for allowing flow of the hydraulic fluid in the extension stroke and a retraction port for allowing flow of hydraulic fluid in the retraction stroke.

5. The hydraulic shock absorber of claim 4, wherein said ports are circular.

6. The hydraulic shock absorber of claim 1, wherein said guide member comprises an interior, a first end and a second end, wherein a first check valve is provided at said first end for preventing flow of the hydraulic fluid from said first end of said guide member into said interior during an extension stroke of said piston and a second check valve is provided at said second end for preventing flow of the hydraulic fluid from said second end of said guide member to said interior during a retraction stroke of said piston, and wherein said plurality of ports further comprises third and fourth ports in said side wall of said cylindrical guide member, said first and second ports defining extension ports for allowing the flow of hydraulic fluid in the extension stroke of said piston and being circumferentially spaced from each other by 180 degrees, and said third and fourth ports defining retraction ports for allowing the flow of hydraulic fluid during the retraction stroke of said piston and being circumferentially spaced from each other by 180 degrees, and wherein said opening is a first opening, and said shutter further comprises second, third and fourth openings, said first and second openings defining extension openings that are axially offset from each other, circumferentially spaced from each by 180 degrees and capable of alignment with said extension ports, and said third and fourth openings defining retraction openings that are axially offset from each other, circumferentially spaced from each other by 180 degrees and capable of alignment with said retraction ports.

7. The hydraulic shock absorber of claim 6, wherein said ports are circular.

8. The hydraulic shock absorber of claim 1, wherein said ports are circular.

9. The hydraulic shock absorber of claim 1, wherein said main hydraulic fluid passage extends through said piston, and said bypass passage extends through said piston rod and through a passage member connected to an end of said piston rod in said cylinder.

10. The hydraulic shock absorber of claim 9, wherein said cylindrical guide member is disposed in said passage member, and said cylindrical shutter is connected to a control rod extending therefrom to the outside of said cylinder through said piston rod for rotation of said shutter in said cylindrical guide member.

11. A hydraulic shock absorber, comprising:
a cylinder having a hydraulic fluid sealed therein;
a piston slidably fitted in said cylinder dividing the inside of said cylinder into two chambers;
a piston rod having one end thereof connected to said piston and the other end thereof extending outside of said cylinder;
a main hydraulic fluid passage extending between said two chambers, said main hydraulic fluid passage comprising a damping force generating mechanism;
a bypass passage extending between said two chambers;
a cylindrical guide member located in said bypass passage and communicating two portions of said bypass passage that communicate with said two chambers, respectively, through a port in a side wall of said cylindrical guide member;
a cylindrical shutter rotatably fitted in said guide member and having a plurality of openings therein, said plurality of openings comprising first and second openings capable of being aligned with said port, said first and second openings being axially offset with respect to each other in the axial direction of said cylindrical shutter and circumferentially spaced from each other;
wherein said port is configured such that when said shutter is rotated in one direction, a damping force created by the flow of hydraulic fluid through said port and one of said first and second openings changes with the amount of rotation of said shutter, said shutter having a first shutter rotation range in which said port is aligned with said first opening so that the damping force continuously changes from a relatively large damping force to a relatively small damping force in a first damping force range and a second shutter rotation range in which said port is aligned with said second opening so that the damping force continuously changes from a relatively large damping force to a relatively small damping force in a second damping force range that is different from said first damping force range.

12. The hydraulic shock absorber of claim 11, wherein said first and second openings are circumferentially spaced from each other by 180 degrees, and said port is a first port, and further comprising a second port in said shutter capable of aligning with said first and second openings, wherein said first and second ports are axially offset from each other and circumferentially spaced from each other by 180 degrees.

13. The hydraulic shock absorber of claim 12, wherein said ports are circular.

14. The hydraulic shock absorber of claim 11, wherein said guide member comprises an interior, a first end and a second end, wherein a first check valve is provided at said first end for preventing flow of the hydraulic fluid from said first end of said guide member into said interior during an extension stroke of said piston and a second check valve is provided at said second end for preventing flow of the hydraulic fluid from said second end of said guide member to said interior during a retraction stroke of said piston, and wherein said plurality of openings comprises an extension opening for allowing flow of the hydraulic fluid in the extension stroke and a retraction opening for allowing flow of the hydraulic fluid in the retraction stroke.

15. The hydraulic shock absorber of claim 14, wherein said ports are circular.

16. The hydraulic shock absorber of claim 11, wherein said guide member comprises an interior, a first end and a second end, wherein a first check valve is provided at said first end for preventing flow of the hydraulic fluid from said first end of said guide member into said interior during an extension stroke of said piston and a second check valve is provided at said second end for preventing flow of the hydraulic fluid from said second end of said guide member to said interior during a retraction stroke of said piston, and wherein said plurality of openings further comprises third and fourth openings in said side wall of said cylindrical guide member, said first and second openings defining extension openings for allowing the flow of hydraulic fluid in the extension stroke of said piston and being circumferentially spaced from each other by 180 degrees, and said third and fourth openings defining retraction openings for allowing the flow of hydraulic fluid during the retraction stroke of said piston and being circumferentially spaced from each other by 180 degrees, and wherein said port is a first port, and said shutter further comprises second, third and fourth ports, said first and second ports defining extension ports that are axially offset from each other, circumferentially spaced from each by 180 degrees and capable of alignment with said extension openings, and said third and fourth ports defining retraction ports that are axially offset from each other, circumferentially spaced from each other by 180 degrees and capable of alignment with said retraction openings.

17. The hydraulic shock absorber of claim 16, wherein said ports are circular.

18. The hydraulic shock absorber of claim 11, wherein said ports are circular.

19. The hydraulic shock absorber of claim 11, wherein said main hydraulic fluid passage extends through said piston, and said bypass passage extends through said piston rod and through a passage member connected to an end of said piston rod in said cylinder.

20. The hydraulic shock absorber of claim 19, wherein said cylindrical guide member is disposed in said passage member, and said cylindrical shutter is connected to a control rod extending therefrom to the outside of said cylinder through said piston rod for rotation of said shutter in said cylindrical guide member.

* * * * *